US009345060B1

(12) United States Patent
Ramamurthy et al.

(10) Patent No.: US 9,345,060 B1
(45) Date of Patent: May 17, 2016

(54) INVOKING CIRCUIT SWITCHED FALLBACK IN RESPONSE TO VOIP CALL SETUP FAILURE

(71) Applicant: Sprint Spectrum L.P., Overland Park, KS (US)

(72) Inventors: Suryanarayanan Ramamurthy, Olathe, KS (US); Saravana Velusamy, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 429 days.

(21) Appl. No.: 13/848,521

(22) Filed: Mar. 21, 2013

(51) Int. Cl.
*H04W 76/02* (2009.01)
*H04W 36/00* (2009.01)

(52) U.S. Cl.
CPC ........ *H04W 76/027* (2013.01); *H04W 36/0066* (2013.01)

(58) Field of Classification Search
None
See application file for complete search history.

(56) References Cited

U.S. PATENT DOCUMENTS

| | | | |
|---|---|---|---|
| 7,808,942 B2 | 10/2010 | Bui et al. | |
| 7,929,517 B2 | 4/2011 | Lin et al. | |
| 8,306,537 B2 | 11/2012 | Burbidge et al. | |
| 2005/0002339 A1* | 1/2005 | Patil et al. | 370/237 |
| 2005/0198384 A1 | 9/2005 | Ansari et al. | |
| 2006/0062228 A1 | 3/2006 | Ota et al. | |
| 2010/0049843 A1 | 2/2010 | Xiong et al. | |
| 2010/0182912 A1* | 7/2010 | Hongisto | H04L 12/5695 370/242 |
| 2011/0280217 A1* | 11/2011 | Drevon et al. | 370/331 |
| 2012/0231793 A1 | 9/2012 | Wu | |
| 2013/0265884 A1* | 10/2013 | Brombal et al. | 370/242 |
| 2014/0219272 A1* | 8/2014 | Shuman et al. | 370/352 |

OTHER PUBLICATIONS

U.S. Appl. No. 13/780,958, filed Feb. 28, 2013.
U.S. Appl. No. 13/800,306, filed Mar. 13, 2013.
"3rd Generation Partnership Project; Technical Specification Group Services and System Aspects; General Packet Radio Service (GPRS) enhancements for Evolved Universal Terrestrial Radio Access Network (E-UTRAN access (Release 9)," 3GPP TS 23.401 V9.10.0, (Sep. 2011).
"IMS PDN connection deactivation while the UE in the idle state," SA WG2 Meeting #93, S2-123525, Oct. 11, 2012.
"IMS PDN connection while the UE is in the idle state," 3GPP TSG-SA2 Meeting #93, SA2-123526, version: 9.110, Oct. 11, 2012.
"IMS PDN connection while the UE is in the idle state," 3GPP TSG-SA2 Meeting #93, SA2-123527, version: 10.8.0, Oct. 11, 2012.
"IMS PDN connection while the UE is in the idle state," 3GPP TSG-SA2 Meeting #93, SA2-123528, version: 11.3.0, Oct. 11, 2012.
"Notifying UE on specific PDN disconnection while the UE is in the idle state," SA WG2 Meeting #93, S2-124089, version 11.3.0, Oct. 12, 2012.
"Notifying UE on specific PDN disconnection while the UE is in the idle state," SA WG2 Meeting #93, S2-124134, version: 10.8.0, Oct. 12, 2012.

(Continued)

*Primary Examiner* — Christine Duong

(57) ABSTRACT

A network node through which VoIP call setup signaling passes between a user equipment device (UE) and a VoIP call server detects VoIP call setup failure and responsively invokes setup of an alternate call between the UE and the called destination. For instance, a packet-gateway in an LTE network may detect VoIP call setup failure and may responsively invoke setup of a circuit-switched fallback call between the UE and the called destination.

13 Claims, 5 Drawing Sheets

(56) References Cited

OTHER PUBLICATIONS

"3rd Generation Partnership Project; Technical Specification Group Core Network and Terminals; Restoration procedures (Release 10)," 3GPP TS 23.007 V10.7.0 (Mar. 2012).

First Action Interview Pilot Program Pre-Interview Communication from U.S. Appl. No. 13/800,306, dated Mar. 9, 2015.
First Action Interview Office Action from U.S. Appl. No. 13/800,306, dated Apr. 15, 2015.
Office Action from U.S. Appl. No. 13/800,306, dated Aug. 10, 2015.

* cited by examiner

INVOKING CIRCUIT SWITCHED FALLBACK IN RESPONSE TO VOIP CALL SETUP FAILURE

BACKGROUND

Unless otherwise indicated herein, the materials described in this section are not prior art to the claims and are not admitted to be prior art by inclusion in this section.

In order to provide user equipment devices (UEs) with access to communicate on a packet-switched network such as the Internet, a wireless service provider may implement a radio access network that is configured to serve the UEs over an air interface and that is coupled with a packet gateway providing connectivity between the RAN and the packet-switched network. When a UE operates within coverage of the RAN, the RAN may work with the UE and the packet gateway to establish one or more bearers for carrying various types of communication traffic between the UE and the packet gateway. Further, the packet gateway or another entity may assign to the UE an Internet Protocol (IP) address for use by the UE to engage in communications on the packet-switched network.

With this arrangement, the UE may then conveniently communicate with entities on the packet-switched network. In particular, the UE may generate packets having headers that specify the UE's assigned IP address as source address and that specify desired destination IP addresses and having payload carrying application-layer content, and the UE may transmit those packets over an appropriate bearer to the packet gateway. Upon receipt of those packets, the packet gateway may then output those packets onto the packet-switched network to be routed to the indicated destination address. Likewise, when packets are transmitted on the packet-switched network to the IP address assigned to the UE, those packets may be routed to the packet gateway (e.g., as a care-of destination for the UE's assigned IP address), and the packet gateway may then transmit those packets over an appropriate bearer to the UE.

Through this process, for example, a UE that supports voice-over-IP (VoIP) communication may conveniently work to set up and engage in VoIP calls, through communication with a VoIP call server (e.g., call control server and media server or media gateway) on the packet-switched network. For instance, if a user of the UE dials a telephone number of a called party, the UE may responsively generate and transmit to the call server a packet-based call initiation message, such as a Session Initiation Protocol (SIP) "INVITE" message designating the called telephone number. The call server and UE may then engage in further call initiation signaling, such as additional SIP signaling, to facilitate setup of a real-time packet-based media session such as a Real-time Transport Protocol (RTP) session between the call server and the UE, and the call server may work to establish connectivity with the called telephone number via the public switched telephone network (PSTN) or similarly through VoIP. With the real-time media session in place between the UE and the call server, and the call connected from the call server to the called party, the UE may then carry on the call with the called party.

In certain implementations, special bearers may be used for this VoIP setup signaling and communication process. For instance, when the UE first registers with the RAN, the RAN may set up a default VoIP signaling bearer for the UE, to be used for SIP signaling to set up VoIP calls. Further, then the UE seeks to initiate a VoIP call, the UE may then further work with the RAN to cause the RAN to establish for the UE a dedicated VoIP bearer for use to carry the real-time voice media between the UE and the call server. The dedicated VoIP bearer may have a defined service level such as a guaranteed bit rate, to help ensure quality voice communication to and from the UE.

OVERVIEW

Unfortunately, for one reason or another, setup of a VoIP call from a UE may not succeed even though the called party or an associated answering service is available to take the call. For example, it is possible that the VoIP call server or associated network elements may be currently overloaded or not working so that the call server is unable to handle the call setup. As another example, there may be a problem with IP communication between the packet gateway and the VoIP call server, as described and addressed further in U.S. patent application Ser. No. 13/800,306, filed Mar. 13, 2013, the entirety of which is hereby incorporated by reference. And as still another example, the wireless service provider may have certain license limitations that prevent the RAN or packet gateway from assigning a dedicated VoIP bearer to the UE for the call. Other examples may be possible as well.

In practice, when VoIP call setup fails, the UE may receive a busy signal or other indication that the call cannot be connected. However, this would result in poor user experience in a situation where the called party or an associated answering service is in fact available. Consequently an improvement is desired.

Disclosed herein is a method and corresponding apparatus to help respond to failure of VoIP call setup. In accordance with the disclosure, a packet gateway or other entity through which VoIP call setup signaling passes will detect VoIP call setup failure and will responsively invoke a process to cause setup of an alternate call between the UE and the called party. In a representative implementation, the alternate call will be a circuit-switched-fallback (CSFB) call, and setup of that call will involve signaling between a fallback RAN and the UE, via the UE's serving RAN, to cause the UE to transition to be served instead by the fallback RAN and to set up the call to the called party via that fallback RAN. By way of example, the serving RAN through which the UE attempts the VoIP call may be a Long Term Evolution (LTE) RAN, and the fallback RAN may be a Code Division Multiple Access (CDMA) or Global System for Mobile Communications (GSM) RAN.

Accordingly, disclosed is a method operable in a communication system that comprises a first RAN configured to serve UEs according to a first air interface protocol, a second RAN configured to serve UEs according to a second air interface protocol, and a network node through which VoIP signaling packets normally flow between the first RAN and a VoIP call server on a packet-switched network. The method may involve the node detecting (i) that a UE served by the first RAN is attempting VoIP call setup to a call destination and (ii) failure of the VoIP call setup. Further, the method may involve, responsive to the detecting, the node signaling to invoke setup of an alternate call between the UE and the call destination via the second RAN.

In addition, disclosed is a method carried out at least in part by a gateway that provides connectivity between an LTE access network and a packet-switched network. The method may involve the gateway receiving packet-data associated with an attempt by a UE served by the LTE access network to set up a VoIP call to a call destination. Further, the method may involve the gateway detecting failure of the VoIP call setup. And the method may involve, responsive to the detecting, signaling from the gateway to a mobility management entity (MME) of the LTE access network to invoke setup of a CSFB call between the UE and the call destination in place of the VoIP call.

Still further, disclosed is a network node through which VoIP call setup signaling passes between UEs and a VoIP call server, with the UEs being served by a first RAN. Such a network node may include a network communication interface for sending and receiving the VoIP call setup signaling. Further, the network node may include a processing unit and non-transitory data storage. And the network node may include program instructions stored in the data storage and executable by the processing unit to carry out various functions described herein. For instance, the functions may include (i) detecting, based on the VoIP call setup signaling, failure of setup of a VoIP call from a UE to a call destination and (ii) responsive to the detecting, invoking setup of a CSFB call between the UE and the call destination.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

As noted above, FIG. 1 is a simplified block diagram of an example network arrangement in which aspects of the present disclosure can be implemented. It should be understood, however, that this and other arrangements and processes described herein are set forth for purposes of example only, and that other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location, and that various disclosed functions can be implemented by any combination of hardware, firmware, and/or software, such as by one or more processors programmed to execute computer instructions for instance.

Figure 1:
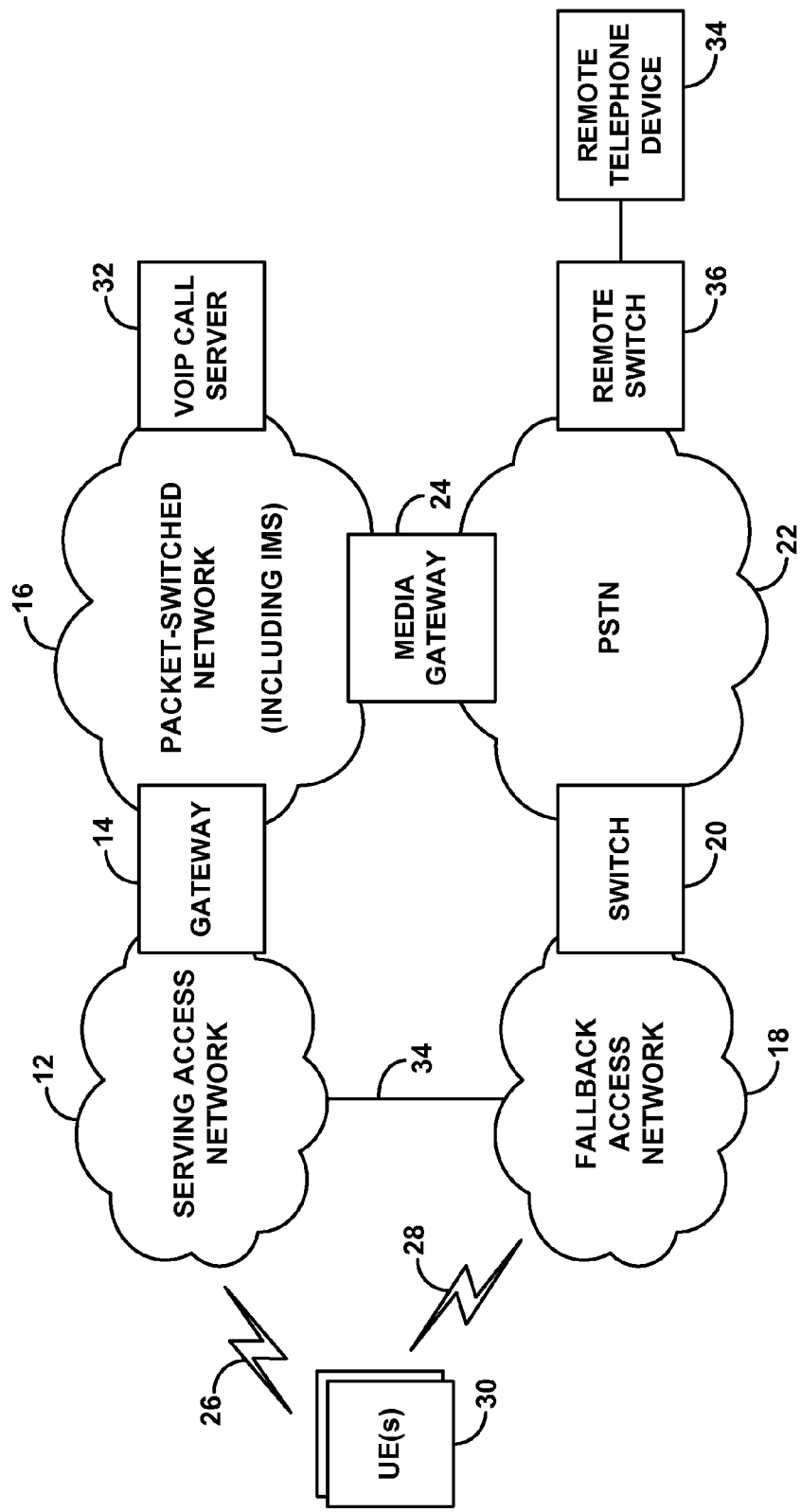
FIG. 1 is a simplified block diagram of an example network arrangement in which aspects of the present disclosure can be implemented.

The arrangement of FIG. 1 includes by way of example a serving access network 12 coupled by a gateway 14 with a packet-switched network 16. As shown, the gateway 14 sits as a bridge between the access network 12 and the packet-switched network 16 (effectively sitting as a node on both networks), functioning to provide connectivity between those two networks. Further, the arrangement includes a fallback access network 18 coupled by a switch 20 with the PSTN 22, and similarly here, the switch 20 sits as a bridge between the fallback access network 18 and the PSTN 22, functioning to provide connectivity between those two networks. In addition, the arrangement includes a media gateway 24 coupling the packet-switched network 12 with the PSTN 22, and functioning to provide connectivity between those two networks as well.

In the arrangement shown, each of the access networks 12, 18 is a RAN that functions to provide UEs with connectivity to one or more transport networks. Each access network may thus be configured to operate according to a defined air interface protocol, examples of which include Orthogonal Frequency Division Multiple Access (OFDMA (e.g., LTE or Worldwide Interoperability for Microwave Access (WiMAX)), CDMA (e.g., 1×RTT or 1×EVDO), GSM, WIFI, and others now known or later developed, with each network communicating over a respective air interface 26, 28. In a representative implementation, for instance, the serving access network 12 may operate according to LTE, and the fallback access network may operate according to CDMA or GSM.

Shown in coverage of both access networks are then a number of UEs 30, which may be configured to engage in air interface communication with the access networks according to the agreed air interface protocols. As such, each such UE may be any cellular telephones or other wirelessly-equipped telephone devices of a type now known or later developed. Further, each UE may be capable of engaging in both VoIP calls and legacy PSTN telephone calls.

To facilitate VoIP call service, the packet-switched network 16 includes an Internet Multimedia Subsystem (IMS), which may comprise a VoIP call server 32, the media gateway 24, and other network nodes such as SIP proxies and the like. This arrangement may allow a representative UE 30 to place a VoIP call (from the UE's perspective) to a telephone number of a remote telephone device 34 served by a remote switch 36 on the PSTN 22.

For instance, when a user of the UE dials the telephone number of device 34, the UE may generate and transmit via air interface 26, serving access network 12, and gateway 14 to the call server 32 a SIP INVITE specifying the dialed telephone number. In response, the call server 32 may then generate and send to the media gateway 24 a SIP INVITE seeking to set up a terminating call leg from the call server to remote telephone device 30. Media gateway 24 may then translate that SIP INVITE to a legacy PSTN call setup signaling message such as a Signaling System #7 (SS7) ISDN User Part (ISUP) Initial Address Message (IAM) and transmit that message to the remote switch 36 serving the called telephone number, which may then work to set up the call to the called device 34. Further signaling may then similarly flow between the remote switch 36, the media gateway 24 and the call server 32 to set up the terminating call leg, while the call server 32 engages in further SIP signaling with the UE to set up an originating leg of the call.

Once those legs are set up, the call server 32 may then bridge the legs together so that the user of the UE can talk with a user of the called telephone device. In particular, voice traffic may flow as an RTP stream between the UE and the call server (via air interface 26, serving access network 12, gateway 14, packet-switched network 16), as an RTP stream between the call sever and the media gateway, and over a PSTN connection between the media gateway and the called telephone device. This is a VoIP call from the UE's perspective, as the UE conducts the call as a VoIP call, even though the end-to-end connection of the call may include one or more portions that are not strictly VoIP.

On the other hand, to place a legacy PSTN call (from the UE's perspective) to the telephone number of remote device 34, the UE may generate and transmit via air interface 28 to fallback access network 18 a call origination message, similarly specifying the dialed telephone number. Switch 20 may then engage in signaling with remote switch 36 to facilitate setup of the call to the called device 30. And once this legacy PSTN call is set up, voice traffic may then flow over a circuit connection between the UE and the switch 20 (via air interface 26 and fallback access network 18), over the PSTN between switch 20 and remote switch 36, and between remote switch 36 and the called telephone device. This is a non-VoIP call from the UE's perspective, since the UE does not conduct the call as a VoIP call.

In practice, the serving access network 12 in this arrangement may also be coupled with the fallback access network 18 through an internetwork signaling link 34, to enable setup of legacy PSTN voice calls for UEs currently served by the serving access network, thereby enabling CSFB functionality.

For instance, a UE served by access network 12 may place such a call by transmitting an extended call origination message over air interface 26 to access network 12, which access network 12 may then pass over the internetwork link 34 to the fallback network 18 for receipt by switch 20. Switch 20 may then set up the requested call as noted above, and the calling UE may transition from being served by access network 12 to being served by fallback access network 18 so as to then engage in the call as a legacy PSTN call via air interface 28.

Likewise, when the UE is served by access network 12 and switch 20 seeks to connect a call to the UE, the switch 20 may transmit via the internetwork link 34 to access network 12 a page message for the UE, and access network 12 may responsively page the UE over air interface 26. The UE may then similarly transition from being served by access network 12 to being served by fallback access network 18 so as to then engage in the call via air interface 28.

In an example implementation of the present disclosure, when a UE seeks to place a VoIP call to a call destination such as remote device 34 for instance, a network node in the VoIP call setup signaling path may detect failure of the VoIP call setup and may responsively invoke setup of an alternate call between the UE and the call destination. For instance, in response to detecting failure of the VoIP call setup, the network node may automatically engage in signaling to invoke a CSFB call from the UE to the call destination in place of the VoIP call from the UE to the call destination.

As particular example of this, gateway 14 may detect failure of VoIP call setup for a VoIP call that a UE 30 is placing via serving access network 12 to remote telephone device 34, such as (i) by determining through deep packet inspection that setup of one or more other VoIP calls served by the same VoIP call server 32 have failed, (ii) by determining through deep packet inspection that setup of the UE's requested VoIP call has failed, and/or (ii) by determining that a dedicated VoIP bearer between the UE and the gateway cannot be set up for the call.

Responsive to detecting failure of the VoIP call setup, gateway 14 may then invoke setup of the alternate call in various ways. By way of example, the gateway may signal to the serving access network 12 to cause the serving access network 12 to signal via internetwork link 34 with fallback access network to switch 20, triggering switch 20 to set up the call for the UE via PSTN 22 to the remote telephone device 34, and triggering switch 20 to page the UE via the internetwork link 34 to cause the UE to transition to be served by fallback access network 18 to engage in the call. And as another example, the gateway may more directly transmit a directive to the UE via the serving access network 12 to cause the UE to initiate the alternate call as a CSFB call to the remote telephone device 34.

Figure 2:
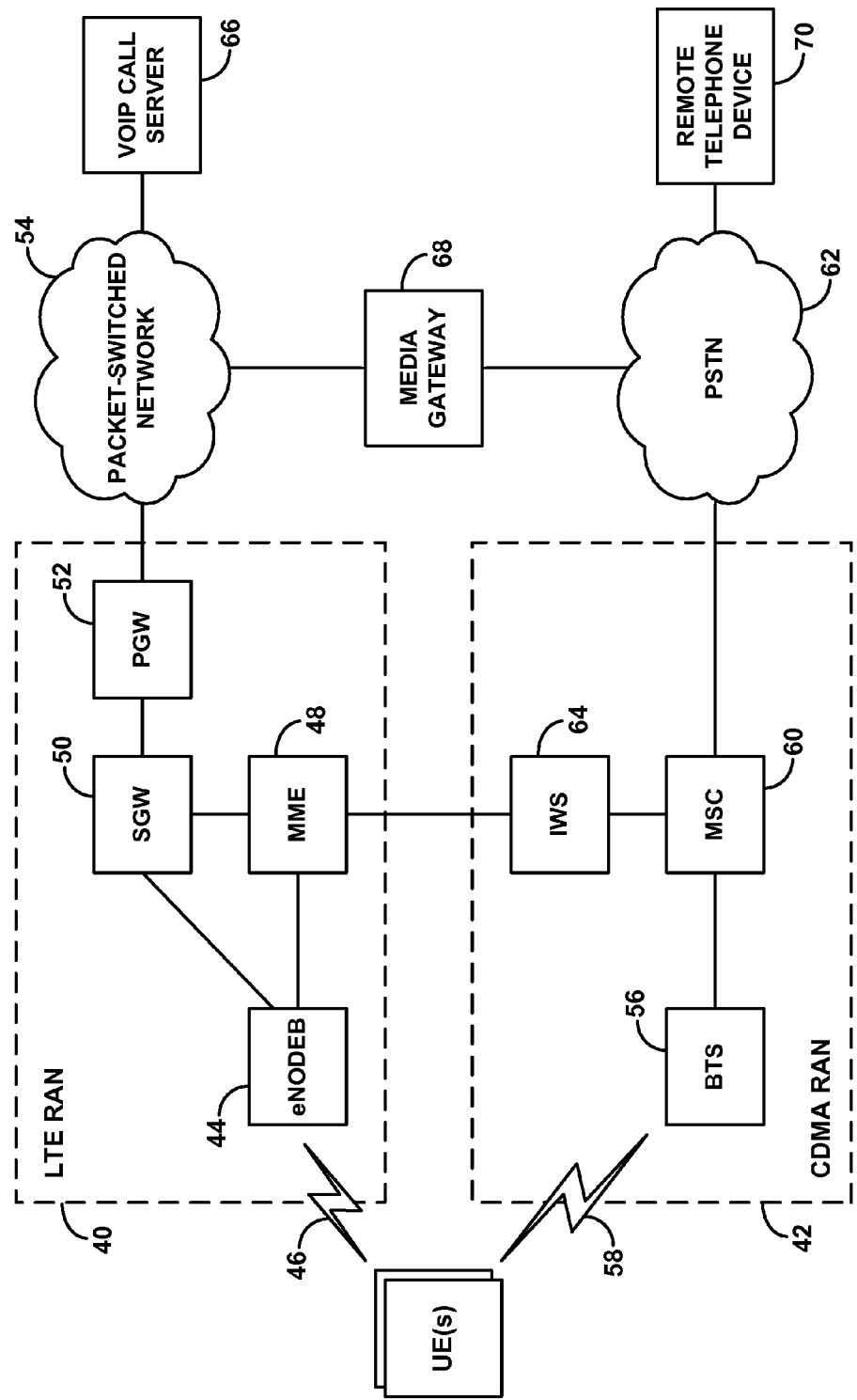
FIG. 2 is another simplified block diagram of a example network arrangement in which aspects of the present disclosure can be implemented.

FIG. 2 is next a more specific but still simplified block diagram of a network arrangement in which this method can be implemented. In this example, the serving access network is an LTE network 40 that primarily serves UEs with wireless packet data communication service (including VoIP and other packet-based real-time media service), and fallback access network is a CDMA network 42 that primarily serves UEs with circuit-switched voice call service (but may also provide packet-data communication service and other types of service).

The LTE network 40 in this arrangement includes a representative LTE base station 44 known as an eNodeB, which has an antenna structure and associated equipment for engaging in LTE communication over an air interface 46 with UEs. The eNodeB 44 has a communication interface with an MME 48 that serves as a signaling controller for the LTE network. Further, the eNodeB has a communication interface with a serving gateway (SGW) 50, and the SGW has a communication interface with the MME and with a packet-gateway (PGW) 52 that connects with a packet-switched network 54. Although these elements are shown with direct connections in the figure, it should be understood that the elements may in practice be nodes on a wireless service provider's core packet network and may thus communicate with each other over that core packet network.

The CDMA network 42, on the other hand, includes a representative CDMA base station 56 known as a base transceiver station (BTS), which includes an antenna structure and associated equipment for engaging in CDMA communication over an air interface 58 with UEs. The BTS then has a communication interface (possibly through a base station controller (BSC) (not shown)) with a mobile switching center (MSC) 60 that functions to manage call setup for UEs and to provide connectivity with the PSTN 62.

As further shown in FIG. 2, the example network arrangement includes an interworking server (IWS) 64, which functions to facilitate interworking between the LTE network 40 and the CDMA network 42 as discussed above, so as to facilitate CSFB functionality for instance. In practice, the IWS may be a function of the MSC 60 or other element of the network or may be a standalone server.

In addition, the example network arrangement includes a VoIP call server 66 on the packet switched network, which functions to support VoIP calling as discussed above, as well as a media gateway 68, which functions as discussed above to facilitate conversion of call setup signaling between the packet-switched network domain and the PSTN domain.

In this arrangement, when a UE first enters into coverage of eNodeB 44, the UE may register or "attach" with the LTE network by transmitting an attach request to the eNodeB, which the eNodeB would forward to the MME 48. The MME would then engage in signaling with eNodeB and the SGW, which would in turn engage in signaling with the PGW, to facilitate setup of a default bearer for the UE extending over air interface 46 between the UE and the eNodeB and between the eNodeB and the PGW. Further, assuming the UE subscribes to VoIP service, the MME may also work to set up a default VoIP signaling bearer for the UE as well, similarly extending between the UE and the PGW. In addition, in this process, the PGW may assign to the UE an IP address on the packet-switched network 54.

When a user of the UE places a call to a telephone number of a remote telephone device 70, the UE may then engage in SIP signaling with the VoIP call server 66 to set up the call. Further, the UE may request, or the LTE RAN may autonomously establish for the UE, a dedicated VoIP bearer similarly extending between the UE and the PGW, for carrying VoIP call traffic, such as RTP packets. The PGW may detect this effort to set up a VoIP call as VoIP call setup signaling passes over the VoIP signaling bearer, or upon request to set up the dedicated VoIP bearer (e.g., as identified by a particular access point name (APN) or the like). And assuming VoIP call setup succeeds, the user of the UE would then communicate with a user of the remote telephone device (or an associated entity, such as a voice mail server operating on behalf of the called party) as discussed above.

As noted, though, VoIP call setup may fail for various reasons. In this example, one such reason may be that the VoIP call server is overloaded or not working. In that situation, the VoIP call server may not respond to SIP INVITE messages or may respond to the messages with a SIP response including an error code or the like.

In practice, an entity through which VoIP call setup signaling passes between UEs and the VoIP call server, such a PGW 52 for instance, may detect such a problem by receiving and reading VoIP call setup signaling messages, i.e., through deep packet inspection. For instance, the PGW may read the payload of one or more packets transmitted from a UE over a VoIP signaling bearer to detect that the UE is requesting VoIP call setup, and the PGW may then read the payload of one or more packets received over packet-switched network 54 for transmission to the UE over the VoIP signaling bearer and programmatically conclude that a response SIP message indicates failure of VoIP call setup.

Alternatively, the PGW may receive read the payload of packets destined to one or more UEs over VoIP signaling bearers and detect one or more instances of such VoIP call setup failure, and the PGW may programmatically conclude that a threshold extent of such failures and/or a particular instance of such failure indicates that problem exists with VoIP call setup generally. As a result, when the PGW then detects that a given UE is seeking to set up a VoIP call, the PGW may programmatically conclude that the VoIP call setup will fail.

Note also that, instead of the PGW or other such entity itself receiving and reading packets to detect such failure, another entity may do so and may inform the PGW or other such entity of the problem. For instance, a network node in the communication path between the PGW and the VoIP call server may read such packets and then signal to the PGW to notify the PGW of the packet contents, or may similarly conclude that VoIP call setup has failed and may signal to the PGW to notify the PGW of the failure.

Still alternatively, the PGW may determine that communication with the VoIP call server is generally not working, or is not working for communications with a UE's particular assigned IP address. For instance, the PGW may detect a threshold failure of heartbeat or keepalive signaling between the PGW and the VoIP call server, or the PGW may send test packets such as ping requests to the VoIP call server and may detect absence of response, or other threshold poor response to such ping requests. Upon detecting failure of such communication, the PGW may likewise programmatically conclude when the PGW detects that a given UE is seeking to set up a VoIP call that the VoIP call setup will fail.

As another example, VoIP call setup may fail if the LTE RAN is unable to assign to the UE a bearer for the VoIP call, such as a dedicated VoIP bearer for instance. In practice, a wireless service provider may only be able to support a limited number of such bearers concurrently, pursuant to licensing restrictions at the PGW for instance. Thus, when a UE seeks to place a VoIP call, the PGW may detect that no such bearers are available, i.e., the PGW may detect failure to assign to the UE an associated VoIP bearer for the call, and the PGW may therefore programmatically conclude that the VoIP call setup has failed.

In accordance with the present disclosure, when a UE seeks to set up a VoIP call to a call destination and a network node such as PGW 52 detects failure of the VoIP call setup (either actual failure of that VoIP call setup or predicted failure of the VoIP call setup in situations such as those discussed above for instance), the network node will responsively invoke setup of an alternate call between the UE and the call destination. Optimally, for instance, the network node may invoke setup of a CSFB call between the UE and the call destination.

To facilitate this, the network node may read one or more VoIP call setup signaling messages from the UE to obtain from the message(s) the telephone number of the call destination. In a SIP INVITE message, for instance, the called telephone number may be specified in a particular header field. Thus, the network node may read that header field to determine the called telephone number. The network node may then invoke setup of the alternate call, such as a CSFB call, from the UE to that telephone number.

To invoke setup of a CSFB call in the arrangement of FIG. 2, PGW 52 may engage in signaling via SGW 50 with MME 48 to cause MME 48 to invoke setup of the CSFB call to the call destination. In practice, the PGW may perform deep packet inspection of a VoIP call setup message such as a SIP INVITE that the PGW received from the UE, to determine the UE's identifier (e.g., International Mobile Subscriber Identifier (IMSI)) and the called telephone number. The PGW may transmit a message carrying that information to SGW 50, which may in turn transmit a message carrying that information to MME 48. MME 48 may then responsively invoke the CSFB call in various ways.

By way of example, the MME may invoke the CSFB call by signaling to the IWS 64 and in turn to the MSC 60 in much the same way as an extended call origination would flow from the MME to the MSC when the UE itself originates a CSFB call, providing the MSC with UE identifier and called telephone number. In response, the MSC may then set up the call via the PSTN 62 to the remote telephone device 70, and the MSC may page the UE via the IWS and through the LTE RAN to cause the UE transition to acquire connectivity with BTS 56 and to be served by the CDMA RAN 42. Alternatively, the MME may otherwise work with the UE to cause the UE to transition to be served by the CDMA RAN. The UE may then engage in the call via the CDMA RAN and PSTN.

As another example, the MME may invoke the CSFB call by signaling to the UE (i.e., signaling to the eNodeB serving the UE, which would signal in turn to the UE) to direct the UE to instead place the call as a CSFB call. In response to such a directive from the MME, the UE may then abandon its VoIP call setup and instead originate the call as a CSFB call as discussed above for instance.

Optimally, this alternate call from the UE to the called telephone number may be set up in place of the VoIP call without informing the user of the UE of the change. Thus, from the UE's perspective, the call would still be connected to the remote telephone device (or associated entity, such as a voice mail server) as desired, while in fact a VoIP call setup effort had failed and the call had then been set up instead as a CSFB call for instance. Alternatively, the PGW, MME, or other entity may inform the user of the UE by transmitting a notification to the UE in response to which the UE would be programmed to present the user with an indication that VoIP call setup failed and that an alternate call is being set up.

Figure 3:
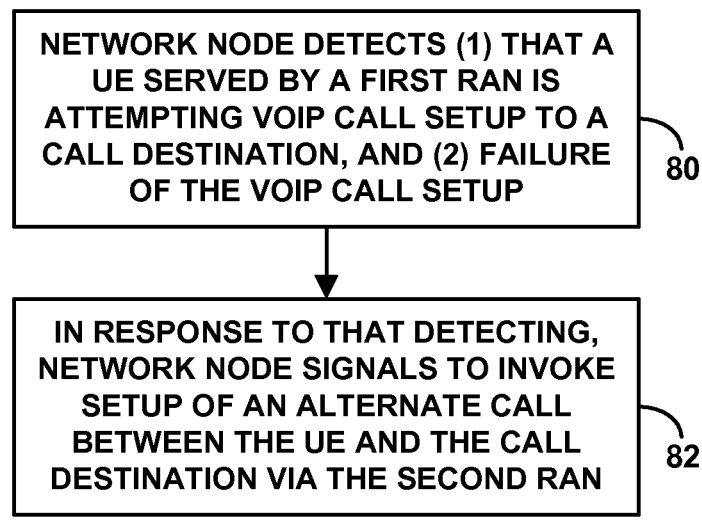
FIG. 3 is a flow chart depicting functions that can be carried out in accordance with the disclosure.

FIG. 3 is next a flow chart depicting in summary various example functions that can be carried out in accordance with the present disclosure. In particular, these functions may be carried out in a communication system that includes a first RAN configured to serve user equipment devices UEs according to a first air interface protocol, a second RAN configured to serve UEs according to a second air interface protocol, and a network node through which VoIP signaling packets normally flow between the first RAN and a VoIP call server on a packet-switched network. For instance, the first air interface protocol may be LTE, the second air interface protocol may be CDMA or GSM, and the functions may be carried out by gateway 14 in the arrangement of FIG. 1 or more specifically by PGW 52 in the arrangement of FIG. 2.

As shown in FIG. 3, at block 80, the functions include the network node detecting (i) that a UE served by the first RAN is attempting VoIP call setup to a call destination, and (ii) failure of the VoIP call setup. For instance, PGW 52 may detect a VoIP call setup effort and actual or predicted failure of that VoIP call setup effort as described above. In turn, at block 82, the functions include, in response to that detecting, the network node signaling to invoke setup of an alternate call between the UE and the call destination via the second RAN. For instance, alternate call may be a CSFB call, and the UE may transition from being served by the first RAN to being served by the second RAN to engage in the CSFB call.

Figure 4:
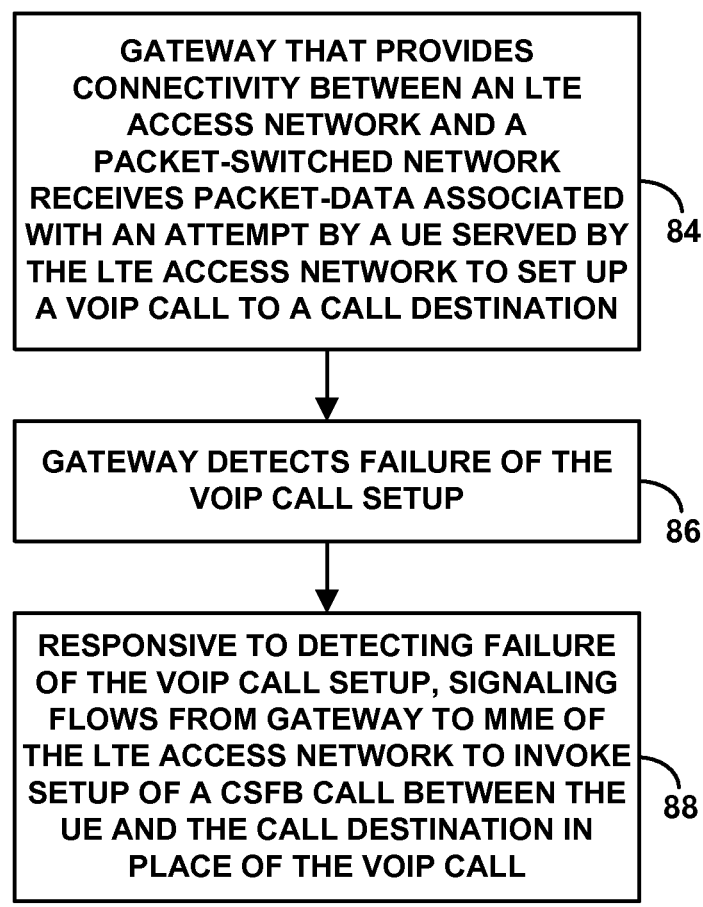
FIG. 4 is another flow chart depicting functions that can be carried out in accordance with the disclosure.

FIG. 4 is next another flow chart depicting example functions that can be carried out in accordance with the present disclosure. As shown in FIG. 4, at block 84, the functions include, at a gateway that provides connectivity between an LTE access network and a packet-switched network, receiving packet-data associated with an attempt by a UE served by the LTE access network to set up a VoIP call to a call destination. Further, at block 86, the functions include detecting by the gateway failure of the VoIP call setup. And at block 88, the functions include, responsive to the detecting, signaling from the gateway to an MME of the LTE access network to invoke setup of a CSFB call between the UE and the call destination in place of the VoIP call.

Figure 5:
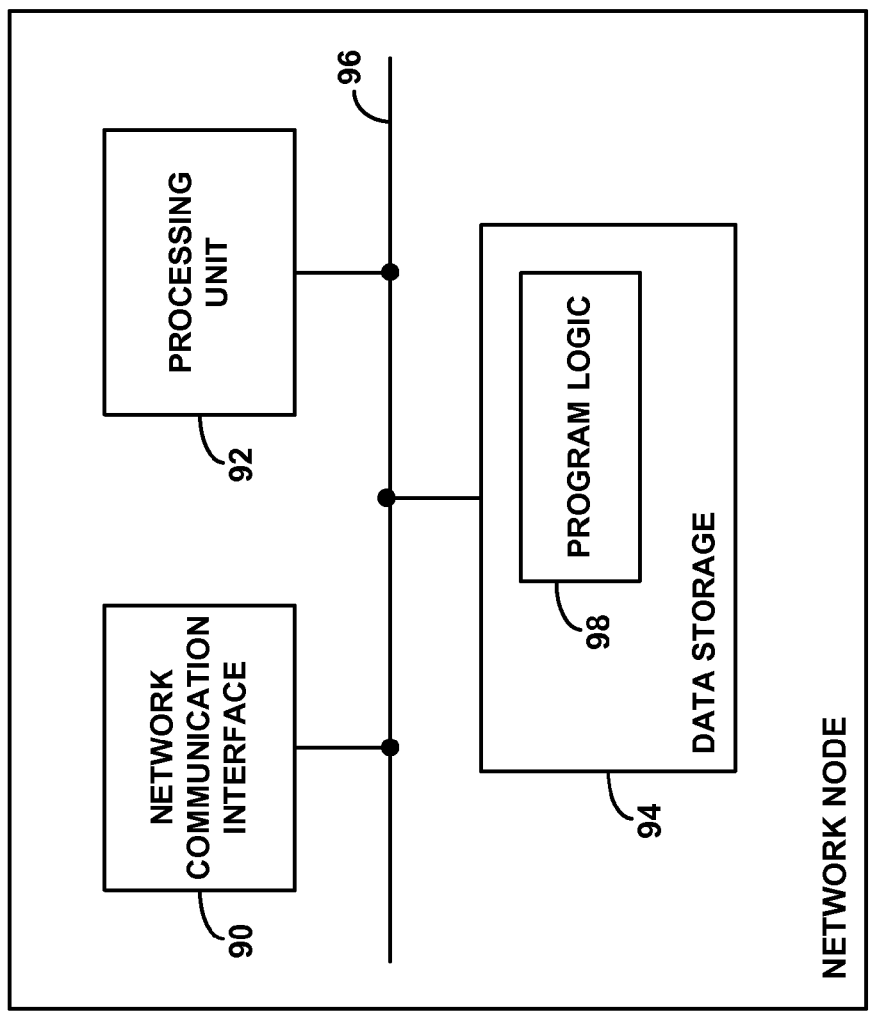
FIG. 5 is a simplified block diagram of a network node arranged to carry out various described functions.

Finally, FIG. 5 is a simplified block diagram of a network node, such as PGW 52 or another entity, through which VoIP call setup signaling may pass between UEs and a VoIP call server, where the UEs are served by a first RAN. As shown, the example network node includes a network communication interface 90, a processing unit 92, and non-transitory data storage 94, all of which may be coupled together by a system bus, network, or other connection mechanism 96.

Network communication interface 90 functions to facilitate communication with other entities (such as SGW 50) and with the packet-switched network, such as sending and receiving of VoIP call setup signaling. As such, the network communication interface may comprise multiple network interface modules, such as Ethernet modules for instance or may take any of a variety of other forms, supporting wireless and/or wired network communication.

Processing unit 92 may then comprise one or more general purpose processors (such as microprocessors) and/or one or more special purpose processors (e.g., application specific integrated circuits). And data storage 94 may comprise one or more volatile and/or non-volatile storage components, such as optical, magnetic, or flash storage, and may be integrated in whole or in part with processing unit 92.

As shown, data storage 94 may hold program instructions 98 that are executable or interpretable by processing unit 92 to carry out various functions described herein. For instance, the program instructions may cause the processing unit, and thus the network node, (i) to detect, based on the VoIP call setup signaling, failure of setup of a VoIP call from a UE to a call destination and (ii) responsive to the detecting, to invoke setup of a CSFB call between the UE and the call destination.

In line with the discussion above, the function of detecting failure of setup of the VoIP call may involve reading one or more of VoIP call setup messages and detecting in the one or more VoIP call setup messages data indicative of the failure. Alternatively or additionally, the function may involve detecting failure to set up a dedicated VoIP bearer for the UE. Further, the function of invoking setup of the CSFB call between the UE and the call destination may involve signaling to a controller of the first RAN to cause the controller to invoke setup of the CSFB call.

Exemplary embodiments have been described above. Those skilled in the art will understand, however, that changes and modifications may be made to these embodiments without departing from the true scope and spirit of the invention.

We claim:

1. In a communication system comprising a first radio access network (RAN) configured to serve user equipment devices (UEs) according to a first air interface protocol, a second RAN configured to serve UEs according to a second air interface protocol, and a network node through which voice over Internet Protocol (VoIP) signaling packets normally flow between the first RAN and a VoIP call server on a packet-switched network, a method comprising:

detecting by the node (i) that a UE served by the first RAN is attempting VoIP call setup to a call destination, and (ii) failure of the VoIP call setup, wherein detecting that the UE is attempting the VoIP call setup and failure of the VoIP call setup comprises receiving a request to establish a dedicated VoIP bearer for the UE and detecting failure to set up the dedicated VoIP bearer, wherein the node is a gateway that provides connectivity between the first RAN and the packet-switched network, and wherein the dedicated VoIP bearer is between the UE and the gateway; and responsive to the detecting, signaling by the node to invoke setup of an alternate call between the UE and the call destination via the second RAN.

2. The method of claim 1, wherein the alternate call is a circuit-switched-fallback (CSFB) call, and wherein the UE transitions from being served by the first RAN to being served by the second RAN to engage in the CSFB call.

3. The method of claim 1, wherein the first air interface protocol is Long Term Evolution (LTE) and the second air interface protocol comprises a protocol selected from the group consisting of Code Division Multiple Access (CDMA) and Global System for Mobile Communication (GSM).

4. The method of claim 1, wherein detecting that the UE is attempting the VoIP call setup and failure of the VoIP call setup comprises:

receiving packet data associated with of the VoIP call setup and determining based on the packet data that the VoIP call setup has failed or will fail.

5. The method of claim 1, wherein the first RAN includes a mobility management entity (MME), and wherein the signaling by the node to invoke setup of the alternate call between the UE and the destination via the second RAN comprises signaling that results in the MME invoking setup of the alternate call.

6. The method of claim 5, the second RAN includes a switch providing connectivity with a public switched telephone network (PSTN), and the MME is communicatively linked with the switch via an interworking server (IWS), and wherein the MME invoking setup of the alternate call comprises signaling from the MME to the switch via the IWS to cause the switch to (i) originate the alternate call between the UE and the destination via the PSTN, (ii) page the UE to cause the UE to transition to be served by the second RAN, and (iii) connect the originated alternate call with the UE via the second RAN.

7. The method of claim 5, wherein the UE is served by a base station of the first RAN, and wherein the MME invoking setup of the alternate call comprises signaling from the MME to the base station and wirelessly from the base station to the UE to cause the UE to (i) signal through the first RAN to the second RAN to cause the second RAN to set up the alternate call and (ii) transition to be served by the second RAN to engage in the alternate call.

8. A method comprising:
- at a gateway that provides connectivity between a Long Term Evolution (LTE) access network and a packet-switched network, receiving packet-data associated with an attempt by a UE served by the LTE access network to set up a voice over Internet Protocol (VoIP) call to a call destination;
- detecting by the gateway failure of the VoIP call setup, wherein detecting failure of the VoIP call setup comprises detecting failure to set up a dedicated VoIP bearer for the UE, wherein the dedicated VoIP bearer is between the UE and the gateway; and
- responsive to the detecting failure of the VoIP call setup, signaling from the gateway to a mobility management entity (MME) of the LTE access network to invoke setup of a circuit-switched-fallback (CSFB) call between the UE and the call destination in place of the VoIP call.

9. The method of claim 8, wherein detecting failure of the VoIP call setup comprises reading the received packet-data and determining that the received packet-data contains an error code indicating failure of the VoIP call setup.

10. The method of claim 8,
wherein signaling from the gateway to the MME to invoke setup of the CSFB call in place of the VoIP call comprises signaling from the gateway to the MME to cause the MME to signal to a fallback access network to cause the fallback access network to set up the CSFB call, and
wherein the fallback access network setting up the CSFB call comprises the fallback access network (i) setting up the CSFB call to the destination and (ii) paging the UE via the LTE access network to cause the UE to transition to be served by the fallback access network so as to engage in the CSFB call via the fallback access network.

11. The method of claim 8,
wherein signaling from the gateway to the MME to invoke setup of the CSFB call in place of the VoIP call comprises signaling from the gateway to the MME to cause the MME to signal to the UE to cause the UE to originate the CSFB call, and
wherein the UE originating the CSFB call comprises the UE signaling via the LTE access network to a fallback access network to request origination of the CSFB call, and the UE transitioning to be served by the fallback access network so as to engage in the CSFB call via the fallback access network.

12. A network node through which voice over Internet Protocol (VoIP) call setup signaling passes between user equipment devices (UEs) and a VoIP call server, wherein the UEs are served by a first radio access network (RAN), the network node comprising:
- a network communication interface for sending and receiving the VoIP call setup signaling;
- a processing unit;
- non-transitory data storage; and
- program instructions stored in the non-transitory data storage and executable by the processing unit to carry out functions comprising (i) detecting failure of setup of a VoIP call from a UE to a call destination, wherein detecting the failure of setup of the VoIP call from the UE to the call destination is based on detecting failure to set up a dedicated VoIP bearer for the UE, wherein the network node is a gateway that provides connectivity between the first RAN and the packet-switched network, and wherein the dedicated VoIP bearer is between the UE and the gateway and (ii) responsive to the detecting failure of setup of the VoIP call, invoking setup of a circuit-switched fall back (CSFB) call between the UE and the call destination.

13. The network node of claim 12, wherein invoking setup of the CSFB call between the UE and the call destination comprises signaling to a controller of the first RAN to cause the controller to invoke setup of the CSFB call.

* * * * *